United States Patent
Oakes, Jr.

(10) Patent No.: US 10,864,611 B2
(45) Date of Patent: Dec. 15, 2020

(54) METHOD OF SHARPENING HARDENED THIN METAL BLADES

(71) Applicant: Utitec, Inc., Watertown, CT (US)

(72) Inventor: Samuel W. Oakes, Jr., Plymouth, CT (US)

(73) Assignee: Utitec, Inc., Watertown, CT (US)

( * ) Notice: Subject to any disclaimer, the term of this patent is extended or adjusted under 35 U.S.C. 154(b) by 0 days.

(21) Appl. No.: 15/593,754

(22) Filed: May 12, 2017

(65) Prior Publication Data

US 2018/0326551 A1    Nov. 15, 2018

(51) Int. Cl.
*B24B 3/36* (2006.01)
*B23B 5/00* (2006.01)
*B23C 3/12* (2006.01)

(52) U.S. Cl.
CPC .............. *B24B 3/36* (2013.01); *B23B 5/00* (2013.01); *B23C 3/12* (2013.01); *B23B 2226/125* (2013.01); *B23B 2226/18* (2013.01); *B23B 2228/24* (2013.01); *B23C 2226/125* (2013.01); *B23C 2226/18* (2013.01); *B23C 2228/24* (2013.01)

(58) Field of Classification Search
CPC .... B24B 1/04; B24B 3/36; B24B 3/48; B24B 9/02; B24B 9/04; B23B 2226/125; B23B 2226/18; B23B 2228/24; B23B 5/00; B23C 2226/125; B23C 2226/18; B23C 2228/24; B23C 3/12
USPC .......................................................... 76/82
See application file for complete search history.

(56) References Cited

U.S. PATENT DOCUMENTS

| | | | | |
|---|---|---|---|---|
| 1,462,490 A | * | 7/1923 | Miller | B24B 3/48 451/261 |
| 1,918,111 A | * | 7/1933 | Kohlmiller | B24B 3/48 451/191 |
| 2,644,279 A | * | 7/1953 | Stankovich | B24B 41/066 451/320 |
| 3,875,702 A | * | 4/1975 | Yacos | B23Q 1/36 451/163 |
| 4,026,073 A | * | 5/1977 | Betzler | B24B 3/085 451/239 |
| 4,630,509 A | * | 12/1986 | McLean | B23Q 1/54 269/71 |
| 5,093,975 A | * | 3/1992 | Masters | B23D 19/06 76/101.1 |

(Continued)

FOREIGN PATENT DOCUMENTS

| | | |
|---|---|---|
| CN | 105500122 | 4/2016 |
| DE | 102004008872 A1 | 9/2005 |

(Continued)

*Primary Examiner* — Hwei-Siu C Payer
(74) *Attorney, Agent, or Firm* — Carmody Torrance Sandak & Hennessey LLP

(57) ABSTRACT

The current invention proposes sharpening thin hardened metal blades with the hard turning process using a holder designed to hold the blades in a firm and stiff manner and a ceramic cutting tool held in a fixture. Generally, the cutting tool is held stationary in its fixture while the workpiece, in its holder, is rotated such that it repeatedly comes into controlled contact with the cutting tool. In sharpening operations such as proposed here, it is critical to (i) hold the workpiece firmly and rigidly, and (ii) position the cutting tool in a precise, predictable and reliable manner.

9 Claims, 1 Drawing Sheet

(56) References Cited

U.S. PATENT DOCUMENTS

| | | | |
|---|---|---|---|
| 5,305,526 A | 4/1994 | Althaus | |
| 5,435,771 A | 7/1995 | Gregory | |
| 5,556,321 A | 9/1996 | Kasahara et al. | |
| 5,688,161 A * | 11/1997 | Gregory, III | B24B 3/368 451/208 |
| 6,039,634 A * | 3/2000 | Bach | B23Q 1/4857 451/49 |
| 6,761,623 B1 * | 7/2004 | Baker | B24B 3/365 451/174 |
| 7,284,461 B2 * | 10/2007 | Skrobis | B26B 21/60 148/284 |
| 8,561,508 B2 | 10/2013 | DeVor et al. | |
| 9,102,031 B2 * | 8/2015 | Page | B24B 27/0015 |
| 2002/0189413 A1 * | 12/2002 | Zurecki | B23B 27/10 82/1.11 |
| 2006/0065076 A1 * | 3/2006 | Friol | A63C 3/10 76/83 |
| 2007/0266828 A1 * | 11/2007 | Byers | B24D 15/065 76/82 |
| 2010/0018127 A1 * | 1/2010 | Can | B22F 7/062 51/309 |
| 2011/0247460 A1 * | 10/2011 | Frommer | A63C 3/10 76/83 |
| 2012/0180602 A1 * | 7/2012 | Murphy | B26B 29/025 76/82 |
| 2016/0207172 A1 * | 7/2016 | Weiner | B24B 3/54 |
| 2016/0263720 A1 | 9/2016 | Selles | |
| 2018/0326551 A1 * | 11/2018 | Oakes, Jr. | B24B 3/36 |

FOREIGN PATENT DOCUMENTS

| | | | |
|---|---|---|---|
| EP | 1525065 B1 | | 5/2007 |
| GB | 135978 | * | 12/1919 |
| GB | 166973 | | 7/1921 |
| GB | 170175 | * | 10/1921 |
| GB | 301038 | * | 9/1929 |
| GB | 456720 | * | 11/1936 |
| GB | 545895 | * | 6/1942 |
| WO | 2008131753 A1 | | 11/2008 |
| WO | 2009030575 A1 | | 3/2009 |

* cited by examiner

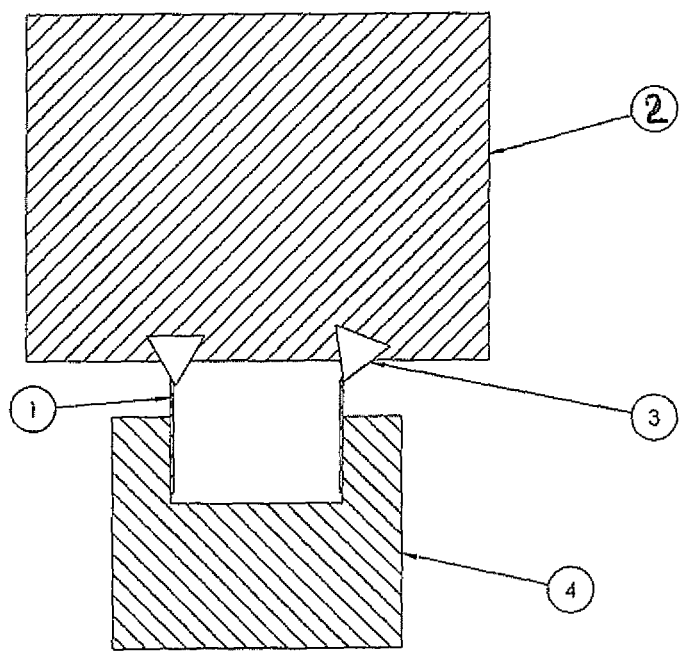

METHOD OF SHARPENING HARDENED THIN METAL BLADES

FIELD OF THE INVENTION

This invention relates generally to the field of sharpening hardened thin metal blades.

BACKGROUND OF THE INVENTION

Producers of machined components and manufactured goods are continually challenged to reduce cost, improve quality and minimize setup times in order to remain competitive. Frequently the answer is found with new technology solutions. Such is the case with grinding where the traditional operations involve expensive machinery and generally have long manufacturing cycles, costly support equipment, and lengthy setup times. Manufacturers around the world constantly strive for lower cost solutions in order to maintain their competitiveness, on machined components and manufactured goods. Globally, part quality has been found to be at acceptable levels and it continues to improve, while the pressure for part piece cost is enormous and is constantly being influenced downward by competition and buyer strategies.

The trend is toward higher quality, lower cost and smaller batch sizes. In order to compete against producing countries with low wage structures, it is necessary to seek out appropriate new technological solutions that can help to level the business playing field. Technology has played an enormous role in advancing the metal working industry and creating opportunities to reduce costs and improve quality. Consider the role technology has played in transforming routine metal cutting operations. At one time machining was very much an operator dependent, skill critical process. Today, CNC machine tools, which operate with mature technology and provide both consistency and reliability, have now become the biggest contributor to part quality and cost. Technology-based tools such as 3-D CAD systems, computer programming, simulation packages and of course the CNC machine tool, are now commonplace in many shops and in most countries of the world. A rapid adoption of these newer and more cost effective manufacturing techniques will be constantly required if manufacturing operations are to remain competitive.

The traditional method for sharpening of hardened thin metal blades is abrasive grinding. As noted, abrasive grinding (i) requires expensive grinding equipment, (ii) can impart damaging heat into the item being sharpened, and (iii) frequently requires re-dressing or qualifying of the grinding wheel or media. All of these factors can make the sharpening of hardened thin metal blades by grinding expensive, difficult, and unpredictable as to the quality of the part.

A technology evolution is occurring in the area of hard turning. Hard turning is defined as the process of single point cutting of part pieces that have hardness values over 45 RC but more typically are in the 58-68 RC range. The cutting tools of choice are typically Cubic Boron Nitride (CBN), Ceramic and sometimes Cermet. The tooling choice will need to be matched to the application, desired production rates and the operating cost goals. CBN is the most dominant choice for the more demanding applications of size and finish. Other applications which have broader tolerance ranges, typically in the area of 0.002" on diameter, might be better candidates for Ceramic tools which have a cost structure similar to carbide.

In any case, the better tool performance will be seen with systems that provide negative rake angles since they have a more robust cutting edge but do place a higher demand on the type of machine tool that can be used and its' inherent stiffness. It is commonly known that carbide is available in a wide range of grades and coatings and which are intended to be best matched to the application. In a similar way CBN cutting tools are available in several grades and likewise should be properly chosen to the requirements. As an example, a low content CBN insert will not perform well in an interrupted cutting application because it lacks the necessary toughness. Generally, high content CBN inserts have higher toughness whereas low content inserts provide longer tool life in straight turning applications.

The range of hard turned applications will vary based upon the part requirements, tolerance levels, surface finish and very importantly the machine tool. In terms of the process routing, hard turning has been used in a pre-grind operation or in sequences that are followed by superfinishing.

SUMMARY OF THE INVENTION

It is thus an objective of the present invention to overcome the perceived deficiencies in the prior art.

Therefore, in accordance with a first preferred embodiment, the present invention is directed to a method of sharpening hardened thin metal blades, said method comprising holding the thin hardened metal blades in a fixture; holding cutting tools in a jig in a manner such that at least one cutting tool in the jig corresponds to one blade in the fixture; and rotationally repeatedly bringing each metal blade in the fixture into contact with its corresponding cutting tool; such that the blades are sharpened.

In another preferred embodiment, the present invention is directed to a method of sharpening at least one hardened thin metal blade, said method comprising holding the at least one hardened thin metal blades in a fixture; holding at least one cutting tool in a jig in a manner such that the at least one cutting tool in the jig corresponds to one at least one hardened thin metal blade in the fixture; and rotationally repeatedly bringing the at least one hardened thin metal blade being held in the fixture into contact with the at least one cutting tool that corresponds to the at least one hardened thin metal blade; such that the blades are sharpened.

Objectives and advantages of this invention will become more apparent from a consideration of the drawings and ensuing description.

The invention accordingly comprises the features of construction, combination of elements, arrangement of parts and sequence of steps which will be exemplified in the construction, illustration and description hereinafter set forth, and the scope of the invention will be indicated in the claims.

BRIEF DESCRIPTION OF THE FIGURES

FIG. 1 depicts a fixture 4, holding blades 1, and a jig 2, holding cutting tools 3.

DETAILED DESCRIPTION OF THE INVENTION

This invention describes a practice of using hard turning to sharpen hardened thin metal cutting blades of all types—including blades often referred to as "cutting blades" or "razor blades". The technology can be applied to straight, curved or circular blades of all types. The process of this invention applies to blades that are made of thin metal materials that are too hard to machine effectively with traditional machining and where abrasive grinding is expensive or otherwise not suitable. The process of this invention can be 5-30 times faster than grinding, and thus large reductions in cost and increases in productivity can be realized.

As used herein, a blade that has been "hardened" or otherwise a "hardened" blade is a blade that has been enhanced by increasing the hardness of the material by either cold-working, carburization, or a thermal process such as heat treating, all as would be understood by one skilled in the art. Moreover, use of the term "thin" is defined as metal of a thickness of less than 0.062".

Preferably blades 1 to be sharpened are held in a fixture 4 which holds multiple blades 1 at one time. Each blade 1 is sharpened by a corresponding cutting tool 3 which is held in jig 2. Preferably, the jig 2 holds multiple cutting tools 3 such that each cutting tool 3 held in the jig 2 corresponds to a blade 1 held in the fixture 4.

The fixture 4, holding blades 1, is attached to a rotatable spindle of the hard turn machine. The jig 2, holding cutting tools 3, is attached to a pivot on the hard turn machine such that the jig 2 can be pivoted towards blades 1 in fixture 4 on the rotatable spindle.

Thus, the current invention proposes sharpening thin hardened metal blades with the hard turning process using a holder designed to hold the blades in a firm and stiff manner and a ceramic cutting tool held in a jig 2. Generally, the cutting tool is held stationary in its jig 2 while the workpiece, in its fixture 4, is rotated such that it repeatedly comes into controlled contact with the cutting tool. In the alternative, the cutting tool in its jig 2 can be rotated while the workpiece in its fixture 4 is held stationary.

Thus, the current invention proposes sharpening thin hardened metal blades 1 with the hard turning process using a fixture 4 designed to hold blades 1 in a firm and stiff manner and a ceramic cutting tool 3 held in a jig 2. Generally, the cutting tool 3 is held stationary in its jig 2 while the fixture 4, holding blades 1, is rotated such that blades 1 repeatedly come into controlled contact with the cutting tool 3. Obviously, in sharpening operations such as proposed here, it is critical to (i) hold blades 1 firmly and rigidly, and (ii) position the cutting tool 3 in a precise, predictable and reliable manner. In the alternative, the cutting tool in its jig can be rotated while the workpiece in its fixture is held stationary. Either arrangement is acceptable, and the choice will depend on the equipment used. Generally if a lathe is used the cutting tool will remain stationary while the metal blades rotate. If a milling machine, such as a chamfer mill, is used instead of a lathe, then generally the cutting tool will rotate while the metal blades remain stationary. In either case, what is critically important is that the cutting tool and the metal blades be repeatedly brought into controlled precise contact so that the sharpening can occur.

It is important to note that the vast majority of the heat that is generated from the hard turning process is actually removed in the chips of metal cut from the workpiece. For typical dry cut finishing operations where the total metal removed is minimal and depth of cuts are in the order of 0.25 mm or less, the heat imparted to the workpiece by the hard turning operation will be minimal. This is important when dealing with hardened metal parts such as cutting blades because heating the part will alter the hardened state of the part.

The decision to produce under wet or dry conditions is normally made at the individual factory level. Some facilities have a local philosophy or mandate regarding the preference to operate one way or the other and fortunately, either forms of hard turning can be accommodated. There are five important items to consider when choosing to process parts dry. First, the workpiece temperature is somewhat elevated and this should be considered when gaging immediately after cutting. Secondly, dry cutting will have higher temperatures at the tool and a somewhat lower tool life as compared to cutting with coolant. Third, the surface finish for dry cut operations is seldom as good as can be achieved with coolant. Fourth, consideration should be given to the high temperature chips, which must be restricted from operator exposure, and prevented from contacting lubricants that might be present on the machine. Lastly, the tool material needs to be correctly chosen.

Such is the case with ceramic based cutting tools which are prone to early failure under thermal shock conditions, so they would not be good candidates for coolant cutting, and should almost always be operated dry. One effective alternative for dry cutting is a properly configured air jet which is highly recommended for both cooling and chip control. Care should be taken to prevent the chip from re-entering the cut region and passing between the tool and the finished workpiece. This is especially true of facing operations where the chip can easily be re-cut. Surface finish flaws can generally be traced to these conditions and can routinely be avoided by a properly set-up air jet.

Wet operations refer to processes under flood or high-pressure with a water-soluble coolant. The decision to produce under wet or dry conditions is normally made at the individual factory level. Some facilities have a local philosophy or mandate regarding the preference to operate one way or the other and fortunately, either forms of hard turning can be accommodated. There are several key items when choosing to operate wet and the first of these is the type of fluid to be used. Generally, straight oils should be avoided because of the inherent fire hazard. This is particularly true if during a cut the coolant flow is disrupted and the unquenched, high temperature chips contact the oil. Under these conditions, oils with a low flash point could start and sustain a fire.

Another point for wet operations is the importance to properly direct the coolant flow by applying fluid to both the top and the bottom of the tool tip simultaneously. Generated chip strings will frequently shield the coolant from the tool until the chip breaks away. The result is thermal shock and a process of degradation of the cutting edge. High-pressure coolant at pressures of approximately 68-95 atmospheres seems to be beneficial in keeping the chips small and manageable and in making the overall process more robust.

Material types for hard turning applications are as varied as the part forms, and can also be indicative of a rather long list. Commonly processed materials would include all manners of hardened steel alloys such as bearing steels, hot and cold-work tool steels, high-speed steels, die steels and case hardened steels. Inconel, Hastelloy, Stellite and carburized and nitrided irons along with some coatings like high chrome can also be serious candidates for this process.

Some of the advantages of the hard turning technology are:
 (1) The lathe offers the versatility to "Soft Turn" and Hard Turn on the same machine tool. A single machine performing the work of two has the added benefits of freeing up vital floor space and being a much lower capital investment.

(2) Metal removal rates with hard turning are 4 to 6 times' greater than equivalent grinding operations.

(3) Single-point turning of complex contours is routine on a lathe, without the need for costly form wheels.

(4) Multiple operations can be turned with a single set-up, resulting in less part handling and a reduced opportunity for part damage.

(5) Hard turning can achieve low micro-inch finishes. Surface finishes ranging from 0.0001 mm to 0.0004 mm are very common.

(6) The hard turn lathe is generally more adaptable as configuration changes are introduced. Lathes are also able to process small batch sizes and complex shapes.

(7) Environmentally, the hard turned chips are less costly to dispose of than grinding swarf. Dry cut parts without coolant contamination are even more economical to dispose of.

(8) Tooling inventory is low compared to grinding wheels. Moreover, the CBN inserts will generally work in the existing tool holders used for multitudes of operations.

(9) Milling machines can be used as an alternative to a lathe.

In terms of ranking attributes for machines based upon importance, the top of the list should be equipment that operates with low levels of vibration over a wide frequency range. This is achieved by designs with a high dynamic stiffness and which are operated with a low-level of ambient vibration. The dynamic stiffness of a machine is a measure of the ratio of the applied force to the displacement, occurring at the frequency of the exciting force. Typically, the dynamic stiffness is determined for a range of frequency values, which fall within the operating range of the machine tool. The static stiffness on the other hand is simply the ratio of an applied force to the associated displacement. Typically, the dynamic stiffness of a machine tool will establish the upper boundary in achievable part quality. Surface finish, size control and tool life are all dictated by the dynamic stiffness of a machine tool and this make it a vital machine attribute.

As a rule of thumb the forces involved in hard turning are approximately 1.5 to 2 times those for an equivalent annealed workpiece. While many applications are finishing operations with a small depth of cut, the light cuts do not diminish the important need for a high dynamic stiffness. Machine tool designers have known for many years that there is a practical and economical limit as to how statically stiff a machine structure can be effectively designed and produced. Therefore, once the appropriate level of static stiffness has been achieved, the only remaining opportunity to increase the dynamic stiffness is to add damping. This is achieved by technologies such as composite filled bases and hydrostatic way systems.

The next critical machine attribute is derived from a series of elements, which when linked together represent the motion capability and accuracy of the machine tool. This category would include the combined behavior of the machine resulting from the axes resolution, profile accuracy, control features, error compensation, geometric alignments, lost motions, axis stiffness and the effect of thermal distortions from heat generation of internal and external sources. Individually and in concert these elements can each be rather extensive topics of discussion, and they need to be considered when choosing a machine for hard turning. This attribute will dictate the upper bound for profile and contour accuracy, which as stated previously is a significant advantage of hard turning. Furthermore, with the digital technology associated with modern servo systems, computer optimization can be performed so that the system is "tuned" for the most accurate path control.

There are two other elements not part of the machine tool but are very important to overall success. A hard turn process needs rigid spindle tooling and rigid tool holders. Oftentimes the occurrence of chatter or poor part quality can be directly traced to a lack of stiffness in either of these areas. A common miss-assessment is that the problem is associated with the machine tool when enhancements in the tooling will dramatically improve the process. Oftentimes in hard turning the stiffest tooling approach may be the safest and best performing. Quick change tooling systems at either the spindle or the turret may need to be set aside in favor of the greater stiffness of conventional tooling.

Other areas of sensitivity in planning a hard turning application are the tool geometry and the centerline height setting, both of which will influence the cut quality. The orientation of the tools should also be chosen so that the tangential cutting forces are directed into the base of the machine, rather than away from the base. When considering spindle tooling the shorter the distance from the spindle bearings to the cutting location, the better, since the deflection will vary by the cube of the exposed length.

Thus, successful hard turning is dependent upon the entire machining system and not just certain discrete elements. As a way of summary the following items all relate to successful hard turning applications.

(1) machine with a high dynamic stiffness.
(2) Efficient workholding devices.
(3) A correctly chosen CBN grade or other tooling material type.
(4) High quality cutting edges.
(5) Rigid tool mounts.
(6) Appropriate machining parameters.
(7) Part piece rigidity.
(8) Chip management and cooling systems.

Hard turning is a viable process that has real and measurable economic and quality benefits. This is particularly true with a machine tool that has a high level of dynamic stiffness and the necessary accuracy performance. The more demanding the application in terms of finish, roundness and size control, the more emphasis must be placed upon the characteristics of the machine tool.

What is claimed is:

1. A method of sharpening hardened metal blades having a thickness of less than 0.062 inches, said method comprising the steps of:
   a. holding the hardened metal blades in a fixture;
   b. holding cutting tools in a jig in a manner such that at least one of the cutting tools in the jig corresponds to one of the metal blades in the fixture;
   c. rotationally repeatedly bringing each metal blade in the fixture into contact with its corresponding cutting tool, wherein each of the cutting tools has a cutting surface, and each metal blade is brought into contact with the cutting surface of the cutting tool;

such that the blades are sharpened by the cutting surface of the cutting tool by removing metal from the metal blades without the use of grinding by the process of single point cutting of the hardened metal blades.

2. A method according to claim 1 wherein the cutting tool is selected from the group consisting of cubic boron nitride, cermet, carbide or ceramic.

3. A method according to claim 1 further comprising the step of applying a coolant to the blades as they are sharpened.

4. A method according to claim 3, wherein the step of applying the coolant is at pressures of between 68 and 95 atmospheres.

5. A method according to claim 1 further comprising the step of blowing air on the blades as they are sharpened.

6. A method according to claim 1, further comprising the step of removing metal chips from the metal blade being sharpened.

7. A method of sharpening at least one hardened metal blade having a thickness of less than 0.062 inches, said method comprising:
   a. holding the at least one hardened metal blade in a fixture;
   b. holding at least one cutting tool in a jig in a manner such that the at least one cutting tool in the jig corresponds to the at least one hardened metal blade in the fixture;
   c. rotationally repeatedly bringing the at least one hardened metal blade being held in the fixture into contact with the at least one cutting tool that corresponds to the at least one hardened metal blade, wherein the cutting tool has a cutting surface, and the metal blade is brought into contact with the cutting surface of the cutting tool;
      such that the at least one hardened metal blade is sharpened by the cutting surface of the cutting tool by removing metal from the at least one hardened metal blade without the use of grinding by the process of single point cutting of the at least one hardened metal blade.

8. A method of sharpening at least one hardened metal blade, wherein the metal blade has a thickness of less than 0.062 inches, said method comprising:
   a. holding the at least one hardened metal blade in a fixture;
   b. holding at least one cutting tool in a jig in a manner such that the at least one cutting tool in the jig corresponds to the at least one hardened metal blade in the fixture;
   c. rotationally repeatedly bringing the at least one hardened metal blade being held in the fixture into contact with the at least one cutting tool that corresponds to the at least one hardened metal blade, wherein the cutting tool is ceramic, and the metal blade is brought into direct contact with a surface of the cutting tool;
      such that the at least one hardened metal blade is sharpened by the surface of the cutting tool by removing metal from the metal blade without the use of grinding by the process of single point cutting of the at least one hardened metal blade.

9. A method of sharpening hardened metal blades having a thickness of less than 0.062 inches and a hardness value over 45 RC but less than or equal to 68 RC, said method comprising the steps of:
   holding the hardened metal blades in a fixture;
   holding cutting tools in a jig in a manner such that at least one of the cutting tools in the jig corresponds to one of the metal blades in the fixture;
   rotationally repeatedly bringing each metal blade in the fixture into contact with its corresponding cutting tool, wherein each of the cutting tools has a cutting surface, and each metal blade is brought into contact with the cutting surface of the cutting tool; and
   removing metal from the hardened metal blades without the use of grinding by the process of single point cutting of the hardened metal blades.

* * * * *